May 22, 1945.  S. FOSTER  2,376,678
LANDING GEAR FOR AIRCRAFT
Filed March 15, 1943
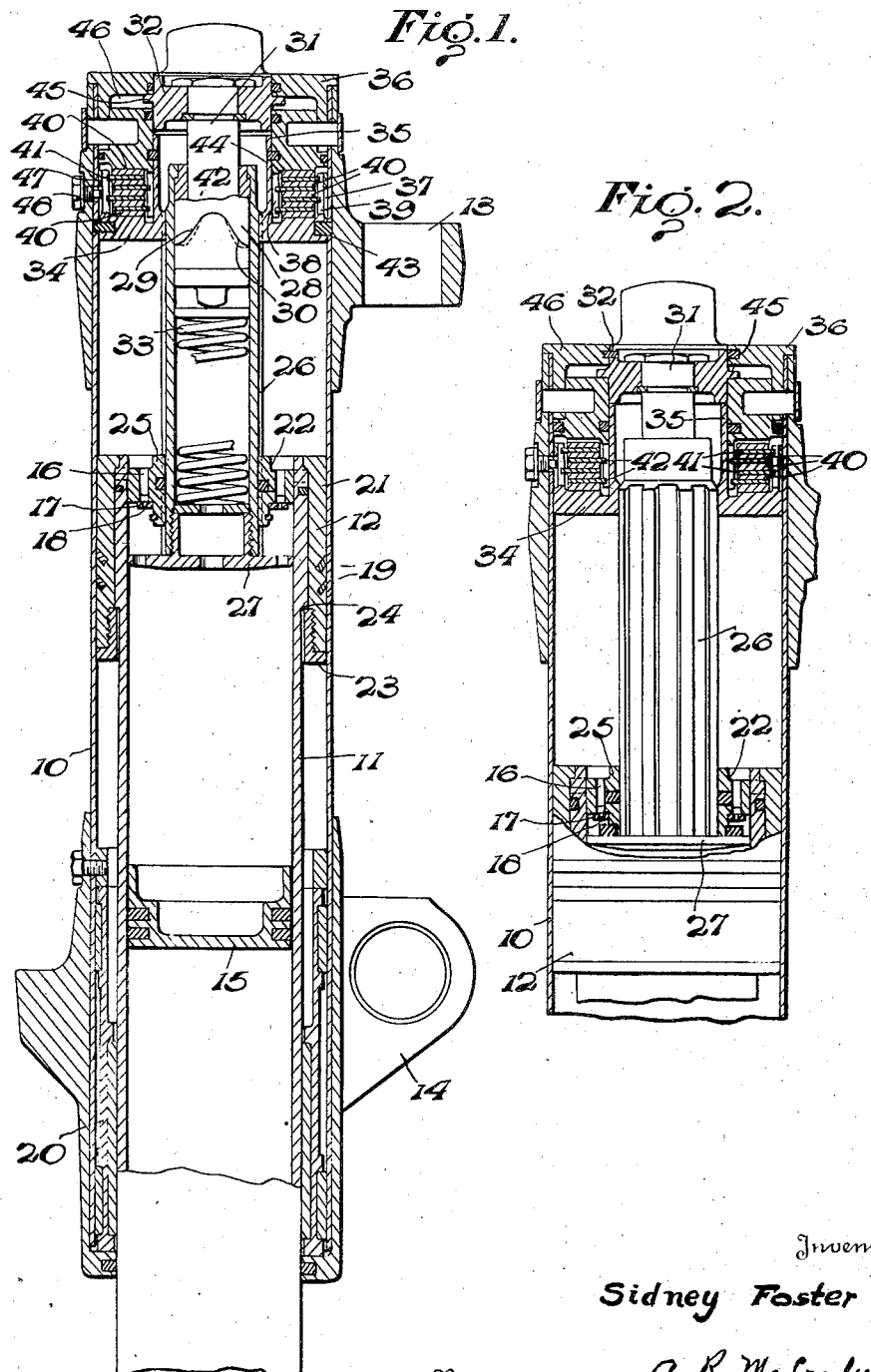
Inventor
Sidney Foster
A. R. McCrady
By
Attorney Patented May 22, 1945

2,376,678

UNITED STATES PATENT OFFICE 2,376,678

LANDING GEAR FOR AIRCRAFT

Sidney Foster, Leamington Spa, England, assignor to Automotive Products Company Limited, Leamington Spa, England Application March 15, 1943, Serial No. 479,273
In Great Britain March 20, 1942

13 Claims. (Cl. 244—104)

This invention relates to landing gear for aircraft, and more particularly to mountings for landing wheels or equivalent landing members (such as endless tracks) of the kind comprising a resilient telescopic strut, one element of which carries the landing member and is movable both telescopically and angularly with respect to the second element, the said second element being fixed in the aircraft. Such mountings are commonly used for the tail wheels of aircraft having the well-known form of landing gear comprising two or more transversely spaced main wheels forward of the centre of gravity, and a single wheel near the tail of the aircraft; and for the nose wheel of the more recent form of landing gear commonly referred to as the "tricycle undercarriage."

These landing members, when deflected from their true fore-and-aft position by striking an obstruction or by any other cause, may tend to oscillate about their normal positions for a considerable period, exerting undesirable strains on the aircraft structure, rendering control difficult, and accelerating the wear of the tires in the case where the landing members are wheels. Various measures have been proposed to damp out such oscillations, such as friction bands and, other friction means, and hydraulic damping. The object of the present invention is to provide an improved friction damping device which, while capable of giving a high torque to resist the oscillations of the landing member, is rendered completely inactive when there is no end load on the mounting.

According to one aspect of the invention, a friction clutch device between a fixed abutment on one element of the strut and a piston or equivalent member rotationally coupled to the other element of the strut is engaged when the strut is compressed, by the pressure of the resilient means of the strut acting on the piston or equivalent member, a movable abutment being provided which is moved by the second element of the strut into a position to support the piston or equivalent member when the strut is fully extended, whereby the pressure on the said piston or equivalent member is prevented from being transmitted to the clutch.

According to another aspect of the invention, the mounting comprises a strut having cylinder and plunger elements, wherein a friction clutch device is arranged between a fixed abutment in the cylinder and a piston or equivalent member coupled to the plunger for rotational movement therewith, an abutment member coupled to the plunger being adapted to engage the piston when the strut is fully extended to support the pressure thereon and prevent it from being applied to the clutch.

The piston is preferably movable axially but not rotationally on a stem rotationally coupled to the plunger, an abutment connected to said stem coming into engagement with the piston when the strut is fully extended to limit the separation of the piston and plunger. The stem may comprise an externally splined tube extending through correspondingly splined apertures in the piston and in a head on the plunger, and may be formed with a stop for engagement by the plunger head to cause the stem to move longitudinally with the plunger during the last portion of the outward movement of the latter.

The invention is hereinafter described with reference to the accompanying drawing, in which:

Figure 1 is a partial sectional elevation of an oleo-pneumatic shock absorber strut forming a mounting according to the invention, the shock absorber being partially compressed; and Figure 2 is a view corresponding to Figure 1 but showing the strut in the fully extended condition.

Referring to the drawing, the strut comprises a cylinder 10 and a plunger slidable therein, the plunger being formed by a tube 11 on which is mounted a head 12. The cylinder is provided with lugs, as shown at 13 and 14, to enable it to be attached to the aircraft, and the plunger tube 11 carries at its lower end (not shown) a fork or other attachment to support the wheel or other landing member. A floating piston 15 in the plunger tube 11 confines a quantity of compressed air in the lower end thereof, and the remainder of the plunger tube together with that part of the cylinder above the plunger head is filled with a liquid which passes through orifices 16 in the plunger head when the plunger moves in the cylinder, the resistance to flow due to the restricted nature of the orifices damping the movement of the plunger. An annular disc 17 formed with orifices 18 smaller than the orifices 16 is guided to move to and from the inner face of the plunger head according to the action of the damping liquid on it, and so to leave the orifices 16 free during the compression stroke of the strut, whilst covering them and reducing the passage for the liquid to that provided by the orifices 18 during the extension stroke, so that the extension stroke is more heavily damped than the compression stroke.

Fluid-tight packings 19 are provided on the plunger head 12, and a bearing sleeve 20 is inserted between the lower end of the cylinder 10 and the plunger tube 11, to provide a bearing for the latter. The plunger head 12 comprises an annular sleeve portion 21 and a central disc 22. The disc 22 is formed with a plurality of radial dogs about its edge which enter slots extending from the inner end of the plunger tube 11, and are clamped therein by corresponding dogs formed internally on the sleeve portion 21, the sleeve portion 21 being retained on the plunger tube by a threaded bush 23 screwed into its lower end and engaging a shoulder 24 on the plunger tube. The disc 22 is thickened centrally at 25, the thickened portion at one side acting as the guide for the valve disc 17. Through the thickened portion 25 is formed a splined hole to receive a correspondingly splined hollow stem 26, a head 27 on which limits the relative downward movement of the plunger. In the upper end of the stem 26 is mounted a sleeve 28 formed at its lower end with a cam face 29 mating with a similar cam face 30 formed on the enlarged end of a stalk 31 mounted in a plunger 32 having a limited degree of longitudinal movement in the cylinder head. The sleeve 28 is fixed against rotational movement in the stem 26, and the plunger 32 is prevented from turning with relation to the cylinder head in any convenient manner. A spring 33 mounted in the stem 26 urges the cam faces 29 and 30 into engagement with each other.

An annular piston 34 slidable in the cylinder is splined internally to fit the stem 26, to which it is thus rotationally coupled, although it is free to slide axially on the stem. From one face of the piston 34, near its inner periphery, projects a sleeve 35, the sleeve entering a central opening in the cylinder head 36, which opening is closed by the plunger 32. The piston 34 thus forms between itself, the cylinder head 36 and the wall of the cylinder 10 an annular chamber 37. A longitudinally slotted sleeve 38 extending from the cylinder head 36 extends across the chamber 37 close to the inner wall, that is the sleeve 35, and a second longitudinally slotted sleeve 39 attached to the piston 34 extends across the chamber close to its outer wall, that is, the cylinder 10. Four annular metal discs, between each two of which is a disc 40 of friction material, lie between the slotted sleeves 38 and 39, two of the discs, indicated at 41, having external dogs or projections to engage the slots in the outer sleeve 39, whilst the other two discs, 42, have internal dogs or projections engaging the slots in the inner sleeve 38. The discs 41 and 42 are arranged alternately, and between the extreme discs and the cylinder head 36 and piston 34 are arranged additional discs 40 of friction material. These parts form a multi-plate friction clutch enclosed in the annular chamber 37, which clutch, when engaged, tends to resist relative turning of the cylinder 10 and piston 34, and thus resists relative turning of the cylinder and plunger, as the plunger is non-rotatable with respect to the piston 34. The chamber 37 is rendered fluid-tight by sealing rings 43 and 44.

The plunger 32 is formed with a collar 45 which lies in a recess 46 in the cylinder head, and limits the longitudinal movement of the plunger. A flat on the edge of the collar 45 may engage a locating piece (not shown) secured to the cylinder head to prevent rotation of the plunger 32. The length of the plunger 32, and the length of the sleeve 35 on the piston 34 are so arranged that when the plunger is in its inner position it engages the sleeve and moves the latter inwardly to free the clutch discs, but when in its outer position it permits the piston to press the clutch discs towards the cylinder head.

A ring 47 soldered or otherwise secured to the slotted sleeve 39 co-operates with a set screw 48 in the cylinder wall to prevent the piston 34 from dropping downwardly when there is no pressure in the strut.

When the strut is in condition for use, the cylinder and the part of the plunger tube above the floating piston 15 are filled with liquid, and air is pumped into the plunger below the floating piston. The compressed air exerts pressure on the liquid, which pressure tends to urge the plunger away from the piston 34, as such movement would increase the volume of the internal space in the strut. Assuming that there is no external load on the strut, the plunger head 12 is held up against the head 27 on the stem, as shown in Figure 2, and this pulls the plunger 32 inwardly through the engaging cam faces 29 and 30 to cause the plunger 32 to engage the sleeve 35 on the piston 34. The plunger 32 thus forms an abutment for the piston 34, and the thrust between the plunger head 12 and piston 34 is resisted by tension in the stem 26, so that no upward thrust can be transmitted through the piston 34 to the clutch plates. The weight of the main plunger and wheel, together with that of the stem and plunger 32, causes these parts to drop under their own weight to a position in which the collar 45 on the plunger 32 rests on the lower wall of the recess 46, leaving the clutch free. As soon as an external load, sufficient to balance the weight of the main plunger and the parts moving with it, is applied to the strut, the main plunger 11, 12 is moved upwardly in the cylinder and the head 12 moves away from the head 27 on the stem. The thrust between the plunger head 12 and the piston 34 is thus no longer taken by the stem 26, and the piston 34 is urged upwardly by the pressure to engage the clutch plates, the engaging pressure being directly proportional to the load on the strut. The pressure also acts on the plunger 32 and moves it away from the sleeve 35 until the collar 45 is in contact with the outer face of the recess 46. Thus any angular movement of the plunger 11, 12 in the cylinder 10 while the strut is loaded is resisted by the clutch to a degree dependant on the leading of the strut, but as soon as the loading of the strut is removed the frictional resistance is also removed, and the plunger is free to return to its neutral position (fore and aft in the aircraft) under the action of the cams 29, 30. These cams, of course, exert a continuous centering torque even when the strut is loaded.

The clutch may evidently be of a type other than that described, being for example a single plate clutch or a cone clutch, and may be of the dry plate type, or may be immersed in fluid, preferably the liquid employed for damping purposes in the shock absorber so that small leakages of such liquid into the clutch unit may have no deleterious effect.

The mounting described may be used for a nose wheel or a tail wheel, and the landing member may be an endless track, ski, or other device equivalent to the wheel described. The resilient element of the strut may be a metallic spring acting on the piston of the clutch device directly, or through a liquid damping medium.

Throughout the specification, the one member of the resilient telescopic strut has been referred to as being fixed with respect to the aircraft. It is to be understood that the term is used only to indicate that this member is incapable of longitudinal or rotary motion under the influence of forces acting on the landing member, and does not exclude the possibility of the member being movable for retraction during flight.

What I claim is:

1. In an aircraft shock absorbing strut having two telescopically associated elements relatively movable both axially and rotationally and adapted to place fluid contained therein under increasing pressure during relative axial movement in a compressive direction, a device for preventing excessive relative rotational movement of said elements when the strut is compressed comprising a fixed abutment on one of said elements, a piston device rotationally coupled to the other of said elements and urged in the direction of said fixed abutment by the pressure of the fluid contained in the strut, a friction clutch device compressed between said piston device and said fixed abutment, and means for supporting the piston device when the strut is fully extended whereby the pressure on said piston device is prevented from being transmitted to the friction clutch.

2. In an aircraft shock absorbing strut having two telescopically associated elements relatively movable both axially and rotationally and adapted to place fluid contained therein under increasing pressure during relative axial movement in a compressive direction, a device for preventing excessive relative rotational movement of said elements when the strut is compressed comprising a fixed abutment on one of said elements, a piston device rotationally coupled to the other of said elements and urged in the direction of said fixed abutment by the pressure of the fluid contained in the strut, a friction clutch device compressed between said piston device and said fixed abutment, and a movable abutment which is moved by one of the said elements of the strut into a position to support the piston device when the strut is fully extended whereby the pressure on the said piston device is prevented from being transmitted to the friction clutch.

3. In an aircraft shock absorbing strut having two telescopically associated elements relatively movable both axially and rotationally and adapted to place resilient means contained therein under increasing pressure during relative axial movement in a compressive direction, a device for preventing excessive relative rotational movement of said elements when the strut is compressed comprising a fixed abutment on one of said elements, a plunger device rotationally coupled to the other of said elements and urged in the direction of said fixed abutment by the pressure of the resilient means contained in the strut, a friction clutch device compressed between said plunger device and said fixed abutment, and a movable abutment which is moved by one of the said elements of the strut into a position to support the plunger device when the strut is fully extended whereby the pressure of the resilient means on the said plunger device is prevented from being transmitted to the friction clutch.

4. In an aircraft landing strut having cylinder and plunger elements relatively movable both axially and rotationally and adapted to place fluid contained therein under increasing pressure during relative axial movement in a compressive direction, a device for preventing excessive relative rotational movement of said elements when the strut is compressed comprising a fixed abutment in the cylinder, a piston device coupled to the plunger for rotational movement therewith and urged toward said fixed abutment by the pressure of the fluid contained in the strut, a friction clutch device compressed between said piston device and said fixed abutment, and an abutment member coupled to the plunger and adapted to engage the piston device when the strut is fully extended, to support the pressure thereon and prevent it from being applied to the friction clutch.

5. In an aircraft strut comprising a cylinder element and a plunger element, said cylinder and plunger elements being relatively movable both axially and rotationally and adapted to place fluid contained therein under increasing pressure during relative axial movement in a compressive direction, a fixed abutment provided in the cylinder, a stem rotationally coupled to the plunger, a piston movable axially but not rotationally on said stem and urged in the direction of said fixed abutment by the pressure of the fluid contained in the strut, a friction clutch device compressed between said piston and said fixed abutment, and an abutment connected to said stem coming into engagement with the piston when the strut is fully extended to limit the separation of the piston and the plunger.

6. In an aircraft strut comprising a cylinder element and a plunger element having a head portion, said cylinder and plunger elements being relatively movable both axially and rotationally and adapted to place fluid contained therein under increasing pressure during relative axial movement in a compressive direction, a fixed abutment provided in the cylinder, a piston urged toward said fixed abutment by the pressure of the fluid contained in the strut, a friction clutch compressed between said piston and said fixed abutment, a stem rotationally coupled to the plunger and to the piston comprising an externally splined tube extending through correspondingly splined apertures in the piston and in the head portion of the plunger, a stop formed on said stem for engagement by the head portion of the plunger to cause the stem to move longitudinally with the plunger during the last portion of the outward movement of the latter, and an abutment connected to said stem and coming into engagement with the piston when the strut is fully extended to limit the separation of the piston and the plunger.

7. In an aircraft strut comprising a cylinder element and a plunger element having a head portion, said cylinder and plunger elements being relatively movable both axially and rotationally and adapted to place fluid contained therein under increasing pressure during relative axial movement in a compressive direction, a fixed abutment provided in the cylinder, a piston urged toward said fixed abutment by the pressure of the fluid contained in the strut, a friction clutch compressed between said piston and said fixed abutment, a stem rotationally coupled to the plunger and to the piston comprising an externally splined tube extending through correspondingly splined apertures in the piston and in the head portion of the plunger, a stop formed on said stem for engagement by the head portion of the plunger to cause the stem to move longitudinally with the plunger during the last portion of the outward movement of the latter, an abutment member connected to said stem coming into engagement with the piston when the strut is fully extended to limit the separation of the piston and the plunger, and a self-centering cam device comprising one element carried by the stem and a second element carried by the abutment member, the abutment member being prevented from rotating with respect to the cylinder element, and the arrangement of the self-centering cam device being such that movement of the stem and abutment member away from one another tends to engage the self-centering cam device.

8. In an aircraft strut comprising a cylinder element and a plunger element having a head portion, said cylinder and plunger elements being relatively movable both axially and rotationally and adapted to place fluid contained therein under increasing pressure during relative axial movement in a compressive direction, a fixed abutment provided in the cylinder, a piston urged toward said fixed abutment by the pressure of the fluid contained in the strut, a friction clutch compressed between said piston and said fixed abutment, a stem rotationally coupled to the plunger and to the piston comprising an externally splined tube extending through correspondingly splined apertures in the piston and in the head portion of the plunger, a stop formed on said stem for engagement by the head portion of the plunger to cause the stem to move longitudinally with the plunger during the last portion of the outward movement of the latter, an abutment member connected to said stem coming into engagement with the piston when the strut is fully extended to limit the separation of the piston and the plunger, and a self-centering cam device comprising one element carried by the stem and a second element carried by the abutment member, the abutment member being prevented from rotating with respect to the cylinder element, and the self-centering cam device including resilient means urging the elements of said device into engagement.

9. In an aircraft strut comprising a cylinder element having a head portion and a plunger element, said cylinder and plunger elements being relatively movable both axially and rotationally and adapted to place fluid contained therein under increasing pressure during relative axial movement in a compressive direction, a fixed abutment provided in the cylinder, a stem rotationally coupled to the plunger, a piston movable axially but not rotationally on said stem and urged in the direction of said fixed abutment by the pressure of the fluid contained in the strut, a friction clutch device compressed between said piston device and said fixed abutment, and an abutment member connected to said stem and mounted for limited longitudinal movement in the head portion of the cylinder element, said abutment member coming into engagement with the piston when the strut is fully extended to limit the separation of the piston and the plunger.

10. In an aircraft structure comprising a cylinder element having a head portion and a plunger element, said cylinder and plunger elements being relatively movable both axially and rotationally and adapted to place fluid contained therein under increasing pressure during relative axial movement in a compressive direction, a fixed abutment provided in the cylinder, a piston coupled to the plunger for rotational movement therewith and urged toward said fixed abutment by the pressure of the fluid contained in the strut, a friction clutch compressed between said piston and said fixed abutment, and a sleeve carried by the piston coaxial with the cylinder and projecting into a recess in the cylinder head to define an annular chamber between the piston and the cylinder head to accommodate the friction clutch.

11. In an aircraft strut comprising a cylinder element having a head portion and a plunger element, said cylinder and plunger elements being relatively movable both axially and rotationally and adapted to place fluid contained therein under increasing pressure during relative axial movement in a compressive direction, a fixed abutment provided in the cylinder, a stem rotationally coupled to the plunger, a piston movable axially but not rotationally on said stem and urged in the direction of said fixed abutment by the pressure of the fluid contained in the strut, a friction clutch compressed between said piston device and said fixed abutment, an abutment member connected to said stem and mounted for limited longitudinal movement in the head portion of the cylinder element, and a sleeve carried by said piston coaxial with the cylinder and projecting into a recess in the head portion of the cylinder to define an annular chamber between the piston and the cylinder head to accommodate the friction clutch, the recess in the cylinder head being closed by the abutment member, and the abutment member having a degree of longitudinal movement in the cylinder head, such that in one extreme position it engages the sleeve carried by the piston and prevents engagement of the piston with the clutch, and in the other position it is clear of said sleeve and permits the clutch to be fully engaged.

12. In an aircraft strut comprising a cylinder element having a head portion and a plunger element, said cylinder and plunger elements being relatively movable both axially and rotationally and adapted to place fluid contained therein under increasing pressure during relative axial movement in a compressive direction, a fixed abutment provided in the cylinder, a piston coupled to the plunger for rotational movement therewith and urged toward said fixed abutment by the pressure of the fluid contained in the strut, a slotted sleeve carried by the piston, a second slotted sleeve carried by the first abutment, and a friction clutch between the piston and the fixed abutment comprising a plurality of annular clutch discs, alternate discs being provided with dogs to engage the slotted sleeve carried by the piston, while intermediate discs are provided with dogs on the opposite edge to engage the slotted sleeve carried by the fixed abutment.

13. A device according to claim 12, wherein the annular clutch discs are plain metal discs, and are spaced by separate discs of friction material disposed between them.

SIDNEY FOSTER.